United States Patent Office 3,350,328
Patented Oct. 31, 1967

3,350,328
PROCESS FOR THE REGENERATION OF POLYETHYLENE TEREPHTHALATE
Vittorio Cappuccio, Terni, and Luigi Canonica, Milan, Italy, assignors to Montecatini Edison S.p.A., Milan, Italy
No Drawing. Filed Nov. 10, 1964, Ser. No. 410,260
Claims priority, application Italy, Nov. 12, 1963, 23,101/63
3 Claims. (Cl. 260—2.3)

ABSTRACT OF THE DISCLOSURE

Recovering polyethylene terephthalate from its waste by melting the polyester waste, contacting the molten waste with ethylene oxide and subsequently removing the unreacted ethylene oxide and volatile materials to recover the regenerated product.

---

This invention is directed to a process for regeneration of polyethylene terephthalate from wastes of said polymer. Heretofore, the processes provided by the prior art for the preparation of regenerated polymer from polyethylene terephthalate waste normally consisted of treating the waste in various stages. These stages include the demolition or degradation of the polymeric waste followed by recovering the degradation products, i.e. terephthalic acid, or the glycolic esters of the acid and subsequently purifying these products so that they could be used for preparing polyethylene terephthalate.

Various processes for preparing polyethylene terephthalate from its waste materials are known in the patent literature and more particularly in U.S. Patent No. 3,037,050. In this patent, a method is described which comprises treating the polyethylene terephthalate waste with methanol so as to recover dimethyl terephthalate. A method for purifying the dimethyl terephthalate obtained by the above process is further described in U.S. Patent No. 3,037,048. Moreover, a process for the regeneration of terephthalic acid from polymethylene terephthalate is described in Italian Patent No. 580,463.

While the above prior art processes of regenerating waste of polyethylene terephthalate are satisfactory, it is an object of this invention to provide a process which allows for the direct regeneration of the terephthalate from its waste without resorting to intermediate stages. In fact, it has been discovered, quite surprisingly, that it is possible to obtain from polyethylene terephthalate waste, which may be in the form of yarns, staples, fabrics, scraps, films, compact masses, etc., a regenerated polymer having a molecular weight higher than that of the polymeric material of the starting waste. These regenerated high molecular weight polymers are obtained from the waste, which is molten and then subjected to a treatment with ethylene oxide. The amount of ethylene oxide used ranges from about 0.1 to 20% by weight of the copolymeric waste material.

More specifically, the process of this invention comprises the melting of the waste material preferably under an inert gas and then bubbling previously dried ethylene oxide through the molten mass for a specific period of time with agitation. A vacuum may be applied to the reaction mass so as to remove the volatile products, if any, coming from the degradation of the polymer and also to remove any of the unreacted ethylene oxide. The final product is subsequently discharged and dried. It is possible, in accordance with the process of this invention, to carry out the degradation of the waste materials either in a continuous or in a batchwise manner.

It has been found that the polyethylene terephthalates obtained from the polyester waste in accordance with this invention have a high degree of purity and can be used for the preparation of fibers, films, shaped articles, and the like. Moreover, the regenerated products have been found to have characteristics different from those of the starting waste material such as, for example, it has been found that the regenerated polymers have higher molecular weights, a higher degree of solubility in various solvents such as the cresols, and a higher percentage of $-CH_2-CH_2-O-CH_2-CH_2-$ units than the starting waste materials.

The following examples are given merely to illustrate the process of this invention and not as a limitation thereof.

Example 1

About 100 g. of polyethylene terephthalate in the form of cut-out films were introduced into a 500 cc. three-necked flask provided with an agitator, an inlet tube and a discharge valve. The polyethylene terephthalate had the following characteristics:

| | Data |
|---|---|
| Intrinsic viscosity $[\eta]$ | 0.60 (measured in O-chlorophenol at 25° C.). |
| $-CH_2-CH_2-O-CH_2-CH_2-$ groups | None. |
| Melting point | 261° C. |

The waste material was washed repeatedly while alternating a vacuum with a nitrogen atmosphere. The polymer was then melted by means of a molten salt bath at 280° C. When the mass was at the point of melting, it was agitated and ethylene oxide, dried on soda lime, was introduced through the inlet tube and bubbled through the polymeric material. After about 25 minutes, both the addition of the ethylene oxide and the agitation were stopped. A distillation unit with a reflux-condenser was applied to the three-necked flask and the entire system was placed under a vacuum, e.g. 0.15 mm. Hg, for about 4 hours at 280° C. with a slight flow of nitrogen. The polymer was then discharged from the system in a molten state and was found to have the following characteristics:

| | Data |
|---|---|
| Intrinsic viscosity $[\eta]$ | 0.80. |
| Melting point | 257° C. |
| Percent of $-CH_2-CH_2-O-CH_2-CH_2-$ groups | 4.5 groups per 100 aliphatic groups. |

Example 2

About 100 g. of polyethylene terephthalate in the form of film cut-outs were introduced into a 500 cc. three-necked flask provided with an agitator, inlet tube and a discharge valve. The polyethylene terephthalate had the following characteristics:

| | Data |
|---|---|
| Intrinsic viscosity $[\eta]$ | 0.49 |
| Melting point, ° C. | 254.5 |

After the waste material was repeatedly washed while alternating the use of a vacuum with the application of a nitrogen atmosphere, the polymer was melted by means of a molten salt bath at 280° C. When the mass was at the point of melting, agitation was started, as was the addition of ethylene oxide which had been pre-dried on soda lime. The ethylene oxide was introduced into the system through the inlet tube and bubbled through the molten polymer. After about 25 minutes, both the feeding of the ethylene oxide and the agitation were stopped. A distillation system with a reflux-condenser was applied to the three-necked flask and placed under a vacuum of about 0.15 mm. of mercury for 4 hours at 280° C. with a slight flow of nitrogen. The polymer was then discharged in the molten state and was found to have the following characteristics:

| | Data |
|---|---|
| Intrinsic viscosity [η] | 0.69 |
| Melting point, ° C. | 256.5 |

Example 3

About 100 g. of polyethylene terephthalate in the form of film cut-outs were introduced into a 500 cc. three-necked flask provided with an agitator, inlet tube, and a discharge valve. The polyethylene terephthalate waste had the following characteristics:

| | Data |
|---|---|
| Intrinsic viscosity [η] | 0.54 |
| Melting point, ° C. | 257.5 |

After the waste material was repeatedly washed while alternating the use of a vacuum with the application of a nitrogen atmosphere, the polymer was melted by means of a molten salt bath at 280° C. When the mass was at the point of melting, the agitation was started, as was the addition of ethylene oxide which had been pre-dried on soda lime. The ethylene oxide was introduced into the system through the inlet-tube and bubbled through the molten polymer. After about 25 minutes of bubbling, both the introduction of the ethylene oxide and the agitation were stopped. A distillation unit with a reflux-condenser was applied to the three-necked flask. The apparatus was placed under a vacuum of about 0.15 mm. of mercury for about 4 hours at 280° C. with a slight flow of nitrogen. The polymer was then discharged in the molten state and was found to have the following characteristics:

| | Data |
|---|---|
| Intrinsic viscosity [η] | 0.79 |
| Melting point, ° C. | 259 |

Example 4

About 100 g. of polyethylene terephthalate in the form of film cut-outs were introduced into a 500 cc. three-necked flask provided with an agitator, inlet tube, and a discharge valve. The polyethylene terephthalate waste had the following characteristics:

| | Data |
|---|---|
| Intrinsic viscosity [η] | 0.55 |
| Melting point, ° C. | 261 |

After the waste material was repeatedly washed while alternating the use of a vacuum with the application of a nitrogen atmosphere, the polymer was melted by means of a molten salt bath at 280° C. When the mass was at the point of melting, agitation was started, as was the addition of ethylene oxide which had been dried on soda lime. The ethylene oxide was introduced into the system through the inlet tube and bubbled through the molten polymer. After about 25 minutes of bubbling both the introduction of ethylene oxide and the agitation were stopped. A distillation unit with a reflux condenser was applied to the three-necked flask and the apparatus was placed under a vacuum of about 0.15 mm. of mercury for 4 hours at 280° C. with a slight flow of nitrogen. The polymer was discharged in the molten state and was found to have the following characteristics:

| | Data |
|---|---|
| Intrinsic viscosity [η] | 0.69 |
| Melting point, ° C. | 260 |

Example 5

About 100 g. of polyethylene terephthalate in the form of film cut-outs were introduced into a 500 cc. nitrogen flask provided with an agitator, inlet tube, and discharge valve. The polyethylene terephthalate waste had the following characteristics:

| | Data |
|---|---|
| Intrinsic viscosity [η] | 0.48 |
| Melting point, ° C. | 263 |

After repeated washings by alternating the use of a vacuum with the application of a nitrogen atmosphere, the polymer was melted by means of a molten salt bath at 280° C. At a point when the mass was melted, agitation and the addition of ethylene oxide were started. The ethylene oxide had previously been dried on soda lime and was introduced through the inlet tube and bubbled through the molten polymer. After about 25 minutes of bubbling, both the introduction of ethylene oxide and the agitation were stopped. A distillation unit with a reflux-condenser was applied to the three-necked flask and the apparatus was placed under a vacuum of about 0.15 mm. of mercury for about 4 hours at 280° C. with a slight flow of nitrogen. The polymer was then discharged in the molten state and found to have the following characteristics:

| | Data |
|---|---|
| Intrinsic viscosity [η] | 0.57 |
| Melting point, ° C. | 251 |

While this invention has been described with respect to a number of specific embodiments, it is obvious that there are many other modifications and variations which can be made without departing from the spirit of the invention, except as more particularly pointed out in the appended claims.

What is claimed is:

1. A process for recovering polyethylene terephthalate from waste polyethylene terephthalate, which process comprises melting said polyester waste, contacting said molten waste with from about 0.1–20% by weight of said polyester waste of ethylene oxide and subsequently removing the unreacted ethylene oxide and volatile materials to recover said polyethylene terephthalate product.

2. The process of claim 1 wherein the polyester waste is contacted with the ethylene oxide under an inert atmosphere.

3. The process of claim 1 further characterized in that the ethylene oxide is dried before being passed through the molten polyester waste.

References Cited

UNITED STATES PATENTS 3,305,495   2/1967   Vom Orde _____ 260—2.3

FOREIGN PATENTS 905,562   9/1962   Great Britain.

SAMUEL H. BLECH, *Primary Examiner.*

MURRAY TILLMAN, *Examiner.*

D. J. BREZNER, *Assistant Examiner.*